Patented Feb. 23, 1943

2,311,911

UNITED STATES PATENT OFFICE 2,311,911

COATING COMPOSITION CONTAINING SHELLAC

Robert C. Swain, Riverside, and Pierrepont Adams, Stamford, Conn., assignors to American Cyanamid Company, New York, N. Y., a corporation of Maine No Drawing. Application October 31, 1940, Serial No. 363,679

4 Claims. (Cl. 260—24)

This invention relates to coating compositions containing shellac and melamine-formaldehyde resins.

An object of this invention is to improve the physical and chemical properties of coating compositions containing shellac, e. g., acid and alkali resistance, solvent resistance, water resistance, heat resistance, etc.

Another object of this invention is to provide compositions containing shellac and compatible proportions of compatible melamine-formaldehyde resins.

These and other objects are attained by blending shellac with a melamine-formaldehyde resin which has been alkylated with an alcohol containing at least 2 carbon atoms and wherein the molal ratio of formaldehyde to melamine is at least about 2.5:1.

The following examples in which the proportions are in parts by weight are given by way of illustration and not in limitation.

Example 1

| | Parts |
|---|---|
| Melamine-formaldehyde resin "A" | 10 |
| Shellac | 90 |

A composition containing these ingredients is prepared by admixing 20 parts of melamine-formaldehyde resin "A" solution (50% resin) with 270 parts of "shellac stock solution" (containing 33.3% of shellac and 66.6% of ethanol (formula 2B anhydrous)). Films of the composition are applied to metal objects and baked at a temperature of about 135° C. for about one-half hour. The product is a hard, transparent coating having good film strength.

Example 2

| | Parts |
|---|---|
| Melamine-formaldehyde resin "B" | 25 |
| Shellac | 75 |

A composition containing these ingredients is prepared by admixing 50 parts of melamine-formaldehyde resin "B" solution (50% resin) with 225 parts of "shellac stock solution." Films of the composition are applied to metal objects and baked at a temperature of about 135° C. for about one-half hour. A clear, tough film is formed.

Example 3

| | Parts |
|---|---|
| Melamine-formaldehyde resin "C" | 50 |
| Shellac | 50 |

A composition containing these ingredients is prepared by admixing 100 parts of melamine-formaldehyde resin "C" solution (50% resin) with 150 parts of "shellac stock solution." Films of the composition are applied to metal objects and baked at a temperature of about 135° C. for about one-half hour. The product formed is a very hard, clear coating.

Example 4

| | Parts |
|---|---|
| Melamine-formaldehyde resin "D" | 90 |
| Shellac | 10 |

A composition containing these ingredients is prepared by admixing 180 parts of melamine-formaldehyde resin "D" solution (50% resin) with 30 parts of "shellac stock solution." Films of the composition are applied to metal objects and baked at a temperature of about 135° C. for about one-half hour. A hard, transparent film is produced.

Example 5

| | Parts |
|---|---|
| Melamine-formaldehyde resin "E" | 75 |
| Shellac | 25 |

A composition containing these ingredients is prepared by admixing 150 parts of melamine-formaldehyde resin "E" solution (50% resin) with 75 parts of "shellac stock solution." Films of the composition are applied to metal objects and baked at a temperature of about 135° C. for about one-half hour. A water-white film having good chemical properties is formed.

Example 6

| | Parts |
|---|---|
| Melamine-formaldehyde resin "F" | 25 |
| Shellac | 75 |

A composition containing these ingredients is prepared by admixing 50 parts of melamine-formaldehyde resin "F" solution (50% resin) with 225 parts of "shellac stock solution." Films of the composition are applied to metal objects and baked at a temperature of about 135° C. for about one-half hour, to give a smooth, transparent finish.

Example 7

| | Parts |
|---|---|
| Melamine-formaldehyde resin "G" | 10 |
| Shellac | 90 |

A composition containing these ingredients is prepared by admixing 20 parts of melamine-formaldehyde resin "G" solution (50% resin) with 270 parts of "shellac stock solution." Films of the composition are applied to metal objects and baked at a temperature of about 135° C. for about one-half hour. A film having improved resistance to acids and alkalis is formed.

*Preparation of melamine-formaldehyde resin "A"*

|   | Parts |
|---|---|
| Melamine (1 mol) | 126 |
| Formalin (4 mols) (37% formaldehyde in water) | 324.4 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91-93° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. During the distillation about 550 additional parts of butanol are added gradually. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

*Preparation of melamine-formaldehyde resin "B"*

|   | Parts |
|---|---|
| Melamine (1 mol) | 126 |
| Formalin (5 mols) (37% formaldehyde in water) | 405.5 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91-93° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. During the distillation about 550 additional parts of butanol are added gradually. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

*Preparation of melamine-formaldehyde resin "C"*

|   | Parts |
|---|---|
| Melamine (1 mol) | 126 |
| Formalin (6 mols) (37% formaldehyde in water) | 486.6 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91-93° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. During the distillation about 550 additional parts of butanol are added gradually. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

*Preparation of melamine-formaldehyde resin "D"*

|   | Parts |
|---|---|
| Melamine (1 mol) | 126 |
| Formalin (5 mols) (37% formaldehyde in water) | 405.5 |
| Ethanol | 440 |

This mixture is refluxed at a temperature of about 75-80° C. at atmospheric pressure for 6-12 hours. Substantially all of the water is removed by distillation with additional ethanol. When substantially all of the water has been removed, the resin solution is concentrated to about 50% solids by vacuum distillation.

*Preparation of melamine-formaldehyde resin "E"*

|   | Parts |
|---|---|
| Melamine | 283 |
| Formalin (37% formaldehyde in water) | 978 |

This mixture is heated at about 70-80° C. until a homogeneous solution is obtained. The pH is adjusted to about 7.3 with caustic soda and vacuum concentrated to remove about 50-60% of the free water. Sufficient phosphoric acid is added to neutralize the caustic soda present and then 320 parts of methanol are added. Wet methanol is gradually distilled off from the mixture and dry methanol is added at about the same rate as wet methanol is distilled off. This distillation and addition of methanol is continued until the distillate is substantially dry methanol. During this operation which requires about 4 hours, about 1600 parts of methanol are added. 707 parts of "Pentasol" (trade name of Sharples Solvents Corporation for mixed amyl alcohols) are added and the distillation is continued until the vapor temperature rises to about 100-105° C. About 710 parts of the distillate are collected. The pressure is lowered sufficiently to reduce the temperature to 80-90° C. and 178 parts more of the distillate are collected, leaving as a product a resin solution containing 50% of resin solids in "Pentasol."

*Preparation of melamine-formaldehyde resin "F"*

| | Parts |
|---|---|
| Melamine (1 mol) | 126 |
| Formalin (5 mols) (37% formaldehyde in water) | 405.5 |
| n-Hexyl alcohol | 500 |
| Methyl alcohol | 200 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 80-85° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. This solution is essentially a hexylated resin in hexyl alcohol, all or nearly all of the methanol having been eliminated from it during the distillation. The resulting resin solution may be diluted to about 50% solids with any desired solvent or diluent, e. g. xylene.

*Preparation of melamine-formaldehyde resin "G"*

| | Parts |
|---|---|
| Melamine (1 mol) | 126 |
| Formalin (5 mols) (37% formaldehyde in water) | 405.5 |
| Benzyl alcohol | 600 |

This mixture is placed in a reflux apparatus which is provided with a condenser and a suitable water trap through which the reflux condensate passes on its return to the reaction chamber and in which the essentially aqueous fraction of the condensate may be separate from the essentially non-aqueous fraction and means is provided so that the former fgraction may be drawn off if desirable. The reaction mixture is refluxed at a temperature of about 93-95° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. In order to facilitate the alkylation with the higher alcohols, e. g., the amyl alcohols, hexyl alcohols and the octanols, a low boiling alcohol such as methanol or butanol may be mixed with the higher alcohol, thereby assisting in removing the water and causing the reaction to take place readily at somewhat lower temperatures than would otherwise be required. The low boiling alcohol is removed by distillation after the reaction is completed. Another method for producing resins alkylated with higher alcohols is to alkylate the melamine-formaldehyde resin with a low boiling alcohol such as methanol and subsequently replacing it with the desired higher alcohol, distilling out the low boiling alcohol. The condensation may be carried out either with or without an acid catalyst and in some instances basic catalysts may desirably be utilized.

The melamine-formaldehyde resins vary slightly according to minor variations in control during their production and in some instances small proportions of a suitable solvent material, e. g., methanol, ethanol, butyl alcohol, amyl alcohol, terpentine, benzene, chloroform, etc., may be added to the original solutions of shellac and melamine-formaldehyde resin in order to produce perfectly clear solutions if such solutions are not originally obtained.

While formaldehyde has been used in the previous examples, it will be obvious that the various polymers of formaldehyde, e. g., paraformaldehyde, or substances which yield formaldehyde may be used in place of part or all of the formaldehyde.

Most of the natural and synthetic resins are compatible only in certain proportions with melamine-formaldehyde resins and with only those resins which are alkylated with particular alcohols. Surprisingly enough we have now found that shellac is compatible with melamine-formaldehyde resins in all proportions wherein the molal ratio of formaldehyde to melamine is at least 2.5:1 and wherein the alcohol contains at least 2 carbon atoms. Butylated melamine-formaldehyde resins wherein the molal ratio of formaldehyde to melamine is about 2.5:1 may be substituted for part or all of the melamine resins used in the above examples. Such resins may be produced by reacting the melamine resins with methanol and subsequently replacing the methanol with butanol. Preferably the melamine-formaldehyde resins should be alkylated with alcohols containing from 2 to 8 carbon atoms. While higher ratios of formaldehyde to melamine than 6:1 may be used, it is generally undesirable inasmuch as formaldehyde is lost during the curing so that usually the product in its cured condition does not contain more than about 6 mols of formaldehyde to 1 mol of melamine.

The resins may be alkylated with any alcohol containing at least 2 carbon atoms. The term "alkylated melamine-formaldehyde resin" is intended to denote compositions which have been reacted with an alcohol.

Our products may be plasticized with a wide variety of materials such as the alkyl phthalates, tricresyl phosphate, various alkyd resins, particularly the fatty oil acid modified alkyd resins, etc.

Various fillers, pigments, dyes and lakes may be added to our compositions, e. g., lithopone, zinc oxide, titanium oxide, ferric oxide, Prussian blue, toluidine red, malachite green, mica, glass fibers, ground glass, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Other resinous compositions may be included in various coating compositions, e. g., urea-formaldehyde resins, phenol-formaldehyde resins, ethyl cellulose, cellulose acetate, nitrocellulose, alkyd resins, etc.

Products made according to our invention have excellent film strength and are very tough. Our products have good electrical properties which render them suitable for use in electrical insulation and the like. Our compositions not only have good dielectric properties but they also have good arc resistance. Our mixtures have much better chemical resistance, solvent resistance, heat resistance, etc., than shellac compositions not containing melamine-formaldehyde resins. The thermoplastic property of shellac which has always been one of the disadvantages of that material is reduced by the use of melamine-formaldehyde resins. Our products are useful in coating paper and cloth as well as in the manufacture of lacquers, varnishes, paints, enamels and the like. Our compositions may be used as adhesives and they may also be used as binders in many ways and for many purposes.

The term "compatible" as used herein is intended to denote compositions, films of which are clear and homogeneous after baking.

Obviously many modifications and variations in the processes and compositions described above may be made without departing from the spirit and scope of the invention as defined in the appended claims.

We claim:

1. A coating composition containing shellac and a melamine-formaldehyde resin which has been alkylated with an alcohol containing from 2 to 8 carbon atoms, wherein the molal ratio of formaldehyde to melamine is between about 2.5:1 and 6:1.

2. A coating composition containing shellac and a melamine-formaldehyde resin which has been alkylated with n-butanol wherein the molal ratio of formaldehyde to melamine is between about 2.5:1 and 6:1.

3. A coatnig composition containing shellac and a melamine-formaldehyde resin which has been alkylated with n-hexyl alcohol wherein the molal ratio of formaldehyde to melamine is between about 2.5:1 and 6:1.

4. A coating composition containing shellac and a melamine-formaldehyde resin which has been alkylated with benzyl alcohol wherein the molal ratio of formaldehyde to melamine is between about 2.5:1 and 6:1.

ROBERT C. SWAIN.
PIERREPONT ADAMS.